(12) United States Patent
Rider

(10) Patent No.: US 7,798,268 B2
(45) Date of Patent: Sep. 21, 2010

(54) THERMOTUNNELING DEVICES FOR MOTORCYCLE COOLING AND POWER GENERATION

(75) Inventor: Nicholas Andrew Rider, Uniontown, PA (US)

(73) Assignee: Borealis Technical Limited, Gibraltar ( * ) Notice: Subject to any disclaimer, the term of this patent is extended or adjusted under 35 U.S.C. 154(b) by 1207 days.

(21) Appl. No.: 11/368,078

(22) Filed: Mar. 3, 2006

(65) Prior Publication Data

US 2006/0226731 A1    Oct. 12, 2006

Related U.S. Application Data

(60) Provisional application No. 60/658,234, filed on Mar. 3, 2005.

(51) Int. Cl.
*B60K 11/00* (2006.01)
(52) U.S. Cl. .............. 180/68.1; 180/68.2; 180/68.3; 180/165
(58) Field of Classification Search ........... 180/68.3, 180/219, 296, 165, 309; 310/306, 307
See application file for complete search history.

(56) References Cited

U.S. PATENT DOCUMENTS

| | | | |
|---|---|---|---|
| 2,510,397 A | 6/1950 | Hansell |
| 2,915,652 A | 12/1959 | Hatsopoulos |
| 3,021,472 A | 2/1962 | Hemqvist |
| 3,118,107 A | 1/1964 | Gabor |
| 3,169,200 A | 2/1965 | Huffman |
| 3,173,032 A | 3/1965 | Maynard |
| 3,194,989 A | 7/1965 | Garbuny |
| 3,238,395 A | 3/1966 | Sense |
| 3,239,745 A | 3/1966 | Hernqvist |
| 3,267,307 A | 8/1966 | Fox |
| 3,267,308 A | 8/1966 | Hernqvist |
| 3,281,372 A | 10/1966 | Haas |
| 3,300,660 A | 1/1967 | Bensimon |
| 3,328,611 A | 6/1967 | Davis |
| 3,376,437 A | 4/1968 | Meyerand, Jr. |
| 3,393,330 A | 7/1968 | Vary |

(Continued)

FOREIGN PATENT DOCUMENTS

DE      4025618 A1    2/1992

(Continued)

OTHER PUBLICATIONS

Fitzpatrick, Gary et al., "Demonstration of Close-Spaced Thermionic Converters", Proceedings of the 28th Intersociety Energy Conversion Engineering Conference, May 1993, pp. 1.573-1.580, vol. 1, American Chemical Society, Washington, DC, USA.

(Continued)

*Primary Examiner*—Hau V Phan
*Assistant Examiner*—Vaughn T Coolman

(57) ABSTRACT

A system for turning waste heat from the engine of a motorcycle into useable electricity through the use of thermotunneling and thermionic devices. The system described also provides cooling for the engine and driver along with pressurized air flow for use in cooling or forced induction. This air flow can also be diverted and pushed through a pored seat to keep the rider cool and dry. The use of thermionic or thermotunneling devices can also be used to aid in the cooling of the water or engine components.

12 Claims, 2 Drawing Sheets

U.S. PATENT DOCUMENTS

| | | | |
|---|---|---|---|
| 3,470,393 A | 9/1969 | Moncorge |
| 3,515,908 A | 6/1970 | Caldwell |
| 3,519,854 A | 7/1970 | Davis |
| 3,578,992 A | 5/1971 | Shimada |
| 3,600,933 A | 8/1971 | Johnston |
| 3,740,592 A | 6/1973 | Engdahl et al. |
| 3,821,462 A | 6/1974 | Kaufman et al. |
| 3,843,896 A | 10/1974 | Rason et al. |
| 3,992,885 A | 11/1976 | Forster |
| 4,004,210 A | 1/1977 | Yater |
| 4,011,582 A | 3/1977 | Cline et al. |
| 4,039,352 A | 8/1977 | Marinescu |
| 4,063,965 A | 12/1977 | Cline et al. |
| 4,097,752 A | 6/1978 | Wolf et al. |
| 4,148,192 A | 4/1979 | Cummings |
| 4,188,571 A | 2/1980 | Brunson |
| 4,199,713 A | 4/1980 | Förster |
| 4,224,461 A | 9/1980 | Snyder, Jr. et al. |
| 4,281,280 A | 7/1981 | Richards |
| 4,373,142 A | 2/1983 | Morris |
| 4,410,951 A | 10/1983 | Nakamura |
| 4,423,347 A | 12/1983 | Kleinschmidt |
| 4,667,126 A | 5/1987 | Fitzpatrick |
| 4,880,975 A | 11/1989 | Nishioka et al. |
| 4,928,030 A | 5/1990 | Culp |
| 4,937,489 A | 6/1990 | Hattori |
| 4,958,201 A | 9/1990 | Mimura |
| 5,028,835 A | 7/1991 | Fitzpatrick |
| 5,049,775 A | 9/1991 | Smits |
| 5,068,535 A | 11/1991 | Rabalais |
| 5,083,056 A | 1/1992 | Kondou |
| 5,119,151 A | 6/1992 | Onda |
| 5,229,320 A | 7/1993 | Ugajin |
| 5,233,205 A | 8/1993 | Usagawa |
| 5,235,803 A | 8/1993 | Rodgers |
| 5,247,223 A | 9/1993 | Mori |
| 5,307,311 A | 4/1994 | Sliwa, Jr. |
| 5,309,056 A | 5/1994 | Culp |
| 5,323,737 A | 6/1994 | Farrell |
| 5,327,038 A | 7/1994 | Culp |
| 5,332,952 A | 7/1994 | Ugajin |
| 5,336,547 A | 8/1994 | Kawakita et al. |
| 5,351,412 A | 10/1994 | Furuhata |
| 5,356,484 A | 10/1994 | Yater |
| 5,371,388 A | 12/1994 | Oda |
| 5,399,930 A | 3/1995 | Culp |
| 5,410,166 A | 4/1995 | Kennel |
| 5,465,021 A | 11/1995 | Visscher |
| 5,487,790 A | 1/1996 | Yasuda |
| 5,503,963 A | 4/1996 | Bifano |
| 5,521,735 A | 5/1996 | Shimizu |
| 5,592,042 A | 1/1997 | Takuchi |
| 5,625,245 A | 4/1997 | Bass |
| 5,675,972 A | 10/1997 | Edelson |
| 5,699,668 A | 12/1997 | Cox |
| 5,699,772 A | 12/1997 | Yonekawa et al. |
| 5,701,043 A | 12/1997 | Razzaghi |
| 5,722,242 A | 3/1998 | Edelson |
| 5,810,980 A | 9/1998 | Edelson |
| 5,874,039 A | 2/1999 | Edelson |
| 5,917,156 A | 6/1999 | Nobori et al. |
| 5,973,259 A | 10/1999 | Edelson |
| 5,981,071 A | 11/1999 | Cox |
| 5,981,866 A | 11/1999 | Edelson |
| 5,994,638 A | 11/1999 | Edelson |
| 6,054,837 A | 4/2000 | Edelson |
| 6,064,137 A | 5/2000 | Cox |
| 6,084,173 A | 7/2000 | DiMatteo |
| 6,089,311 A | 7/2000 | Edelson |
| 6,117,344 A | 9/2000 | Cox et al. |
| 6,166,317 A | 12/2000 | Volk, Jr. |
| 6,175,217 B1 | 1/2001 | Da Ponte et al. |
| 6,192,687 B1 | 2/2001 | Pinkerton et al. |
| 6,214,651 B1 | 4/2001 | Cox |
| 6,225,205 B1 | 5/2001 | Kinoshita |
| 6,229,083 B1 | 5/2001 | Edelson |
| 6,232,546 B1 | 5/2001 | DiMatteo et al. |
| 6,271,614 B1 | 8/2001 | Arnold |
| 6,272,873 B1 | 8/2001 | Bass |
| 6,281,514 B1 | 8/2001 | Tavkhelidze |
| 6,417,060 B2 | 7/2002 | Tavkhelidze et al. |
| 6,489,704 B1 | 12/2002 | Kucherov et al. |
| 6,651,760 B2 | 11/2003 | Cox et al. |
| 6,720,704 B1 | 4/2004 | Tavkhelidze et al. |
| 6,774,003 B2 | 8/2004 | Tavkhelidze et al. |
| 6,869,855 B1 | 3/2005 | Tavkhelidze et al. |
| 2001/0046749 A1 | 11/2001 | Tavkhelidze et al. |
| 2002/0170172 A1 | 11/2002 | Tavkhelidze et al. |
| 2003/0042819 A1 | 3/2003 | Martinovsky et al. |
| 2003/0068431 A1 | 4/2003 | Taliashvili et al. |
| 2003/0152815 A1 | 8/2003 | LaFollette et al. |
| 2004/0029341 A1 | 2/2004 | Cox et al. |
| 2004/0195934 A1 | 10/2004 | Tanielian |

FOREIGN PATENT DOCUMENTS

| | | |
|---|---|---|
| JP | 07322659 A | 12/1995 |
| JP | 10-238406 | 8/1998 |
| WO | WO-97/02460 A1 | 1/1997 |
| WO | WO-99/10974 A1 | 3/1999 |
| WO | WO-99/13562 A1 | 3/1999 |
| WO | WO-99/40628 A1 | 8/1999 |
| WO | WO-03/021758 A2 | 3/2003 |
| WO | WO-03/083177 A3 | 10/2003 |
| WO | WO-03/090245 A1 | 10/2003 |

OTHER PUBLICATIONS

Fitzpatrick, Gary O. et al., "Close-Spaced Thermionic Converters with Active Spacing Control and Heat-Pipe Isothermal Emitters", Proceedings of the 31st Intersociety Energy Conversion Engineering Conference, Aug. 11, 1996, pp. 920-927, vol. 2, IEEE, USA.

Fitzpatrick, Gary O. et al., "Updated perspective on the potential for thermionic conversion to meet 21st century energy needs", IECEC '97, Proceedings of the 32nd Intersociety Energy Conversion Engineering Conference, Energy Systems, Renewable Energy Resources, Environmental Impact and Policy Impacts on Energy, Jul. 27, 1997, pp. 1045-1051, vol. 2, IEEE, USA.

Fukuda, Ryuzo et al., "Development of the Oxygenated Thermionic Energy Converters Utilizing the Sputtered Metal Oxides as a Collector", Space Technology and Applications International Forum—1999, AIP Conference Proceedings, Subseries: Astronomy and Astrophysics, Jan. 22, 1999, pp. 1444-1451, vol. 458, American Institute of Physics, USA.

Hatsopoulos, George N. et al., "Thermionic Energy Conversion—vol. I: Process and Devices", Mar. 15, 1974, p. 222, The MIT Press, USA.

Houston. J.M., "Theoretical Efficiency of the Thermionic Energy Converter", Journal of Applied Physics, Sep. 17, 1959, pp. 481-487, vol. 30, No. 4, American Institute of Physics, New York.

Huffman, Fred N. et al., "Preliminary Investigation of a Thermotunnel Converter", 1988 IECEC; Proceedings of the Twenty-third Intersociety Energy Conversion Engineering Conference, Aug. 1988, pp. 573-579, vol. 1, American Society of Mechanical Engineers, New York.

Kalandarishvili, Arnold G., "The basics of the technology of creating a small interelectrode spacing in thermionic energy converters with the use of two-phase systems", IECEC '97, Proceedings of the 32nd Intersociety Energy Conversion Engineering Conference, Energy Systems, Renewable Energy Resources, Environmental Impact and Policy Impacts on Energy, Jul. 27, 1997, pp. 1052-1056, vol. 2, IEEE, USA.

King, Donald B. et al., "Results from the Microminiature Thermionic Converter Demonstration Testing Program", Space Technology and Applications International Forum—1999, Jan. 22, 1999, pp. 1432-1436, vol. 458, American Institute of Physics, USA.

Mahan, G.D., "Thermionic Refrigeration", Journal of Applied Physics, Oct. 1, 1994, pp. 4362-4366, vol. 76, Issue 7, American Institute of Physics, USA.

Shakouri, Ali et al., "Enhanced Thermionic Emission Cooling in High Barrier Superlattice Hetero- structures", Materials Research Society Symposium Proceedings, Mar. 1999, pp. 449-458, vol. 545, Materials Research Society, Warrendale, Pennsylvania.

Svensson, Robert et al., "TEC as Electric Generator in an Automobile Catalytic Converter", Proceedings of the 31st Intersociety Energy Conversion Engineering Conference, Aug. 1996, pp. 941-944, vol. 2, IEEE, USA.

Zeng, Taofang et al., "Hot Electron Effects on Thermionic Emission Cooling in Heterostructures", Materials Research Society Symposium Proceedings, Mar. 1999, pp. 467-472, vol. 545, Materials Research Society, Warrendale, Pennsylvania.

Abstract of SU 861916 B, Burmistrov, Sep. 10, 1981, "Electrohydrodynamic heat pipe—has needle electrodes situated on wall in condensation zone".

Abstract of JP 404080964 A, Ando, Mar. 13, 1992, "Semiconductor device".

THERMOTUNNELING DEVICES FOR MOTORCYCLE COOLING AND POWER GENERATION

CROSS-REFERENCE TO RELATED APPLICATIONS

This application claims the benefit of U.S. Provisional App. No. 60/658,234, filed Mar. 3, 2005.

BACKGROUND OF THE INVENTION

This invention relates to heat to electricity conversion for use on, but not limited to, a motorcycle, particularly a cruiser style street motorcycle.

Motorcycles produce an excess of waste heat which not only reduces efficiency but can cause discomfort for the rider. Current cooling systems move the heat away from the engine components, either utilizing open air systems or water cooling. Water cooling systems require energy to be diverted from the engine to power the system and are used on a minority of motorcycles. In practically all systems, while the motorcycle is not in motion, heat from the engine passes to the rider.

In current systems, none of the waste heat is converted into useful energy.

U.S. Pat. No. 4,097,752 to Wolf et al. discloses an internal combustion engine in which at least one thermionic converter is acted upon by the hot exhaust gases to generate electricity, which is used to power an electric motor.

U.S. Pat. No. 4,199,713 to Förster discloses an installation for supplying the electric power supply of motor vehicles that includes a generator, a battery as storage device or accumulator and several loads. A thermionic converter of conventional construction, which is operable with the fuel of the motor vehicle, is provided as generator. The electricity generated by the thermionic converter is used to power such ancillary devices as the ignition system, the injection installation, the starter, the light system, the ventilating system, the air conditioning system as well as under certain circumstances also auxiliary apparatus such as, for example, the radio, air-conditioning and the like. This arrangement generates electricity for these ancillary devices when the engine is not running, and also obviates the requirement for an alternator, with concomitant savings. This arrangement does not, however, provide enough electrical energy to propel the car via an electric motor.

U.S. Pat. No. 6,651,760 to Cox and Reave discloses a combustion chamber-thermionic device-electric motor combination. The combustion chamber provides a heat output which is transformed to electricity by the thermionic device and a motor converts the electrical energy to motive power for the wheels.

U.S. Patent Application No. 2004/0099304 to Cox discloses an improved electrical power unit for use in automobiles, on aircraft, or for local generation of electrical power. The electrical power unit comprises: a combustion chamber that burns fuel to produce heat energy; and a thermionic device that converts the heat energy into electrical energy. In another embodiment of the present invention, the electrical power unit additionally comprises an electric motor.

There are no current cooling systems for motorcycles that use any form of thermotunneling or thermionic device.

BRIEF SUMMARY OF THE INVENTION

The present invention allows for waste heat from the motorcycle to be converted into useable electrical energy through the use of thermionic or thermotunneling devices.

The present invention comprises: one or more thermionic or thermotunneling devices connected to the motorcycle through heat sinks, and optionally; a pored seat, a system of hoses, pumps, fans and water to move cooling water and air through the system, a catalytic converter type device for focusing heat from the exhaust and a forced induction system that also acts as a radiator.

One or more thermionic or thermotunneling devices can be used either for cooling or power generation. A standard water cooling system can be used to keep some of these devices running at a high efficiency.

The present invention solves many of the problems found in conventional cooling systems.

Thus, a technical advantage of the present invention is that electricity is generated with few moving parts, and component parts of the present invention are resistant to thermal and other shocks. This means that little to no maintenance is required.

A further technical advantage of the present invention is that the size of the components involved can be scaled to the size of the motorcycle and amount of electrical power and cooling desired.

Other technical advantages of the present invention were set forth in or will be apparent from the drawings and the description of the invention that follows, or may be learned from the practice of this invention.

BRIEF DESCRIPTION OF THE SEVERAL VIEWS OF THE DRAWING

For a more complete explanation of the current invention and the technical advantages thereof, reference is now made to the following description and the accompanying drawing in which.

DETAILED DESCRIPTION OF THE INVENTION

For purposes of illustration, the present invention is discussed with reference to standard thermionic or thermotunneling converters. However, it is understood that the present invention may be used in conjunction with any thermionic device that acts to convert input heat energy to output electrical energy. Similarly, the present invention may be used in conjunction with any thermionic device that acts to covert input electrical energy to output cooling.

Furthermore, for purposes of illustration, the present invention is discussed with reference to motorcycles. However, it is to be understood that the present invention may be used in conjunction with any vehicle in which excess heat from the engine causes discomfort to human users due to their close proximity to the relevant component parts. Thus, the term 'motorcylce' is to be understood to mean any kind of small self-propelled vehicle, including motorcycles, mopeds, electric scooters, trail bikes, road bikes, touring bikes and racing bikes.

The present invention relates to thermionic or thermotunneling converters both in their capacity to produce electricity from a heat differential and in their capacity to produce cooling from electricity. For the purpose of clarity, thermionic or thermotunneling converters will herein be referred to either as Powerchips when described in their capacity to generate power, and Coolchips in their capacity to produce cooling.

Figure 1A:
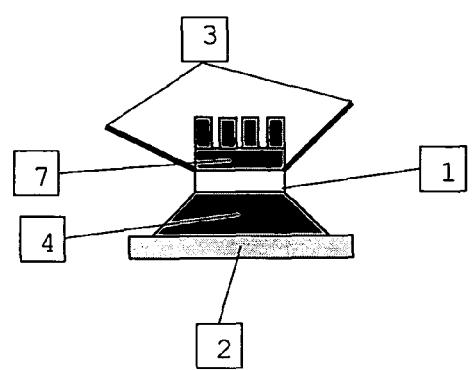
FIGS. 1a-c are three vertical cross sections of the thermionic or thermotunneling converter and methods of cooling it.
Figure 1B:
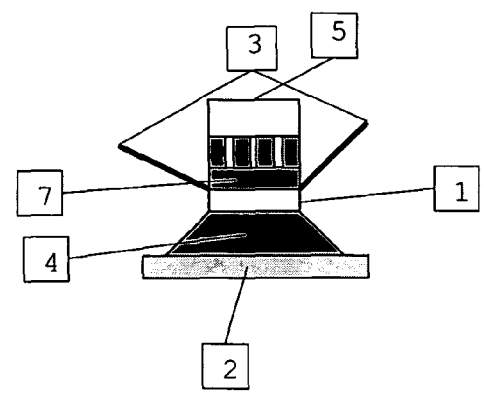
Figure 1C:
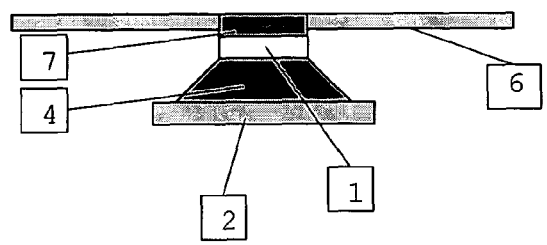

Referring now to FIG. 1a, one or more Powerchips 1 are attached to a hot area 2 on the engine or exhaust of a motorcycle. Powerchips generate electricity from a temperature differential, and therefore require a hotter side and a colder side. In the present invention, the hot side of the Powerchips are placed adjacent to a hot area 2 on the motorcycle while the colder side is adjacent to a heat sink 7. Heat conduction to the Powerchips can be aided through the use of a heat conductor 4 between Powerchips 1 and hot area 2. Electrical leads 3 leading from converters 1 are then connected to the motorcycle's electrical system to provide a voltage bias to the Powerchips where needed, and to receive additional electric power from the Powerchips. Powerchips 1 can be cooled by the use of a simple heat sink 7 and a fan 5 (shown in FIG. 1b), or a heat sink 7 and a water cooling system 6 (shown in FIG. 1c without the electrical leads 3). The heat sink may be a single device connected to all the Powerchips 1, or a multiple of heat sink devices, or simply a cooling fluid.

The better the cooling of the cold side of the chip, the more electrical power is produced.

Powerchips 1 are not limited in number and may comprise a single device adapted to surround hot area 2, or multiple Powerchips strategically placed around area 2, for extracting as much heat therefrom as possible.

A number of Powerchips can be attached to the exhaust, headers and engine simultaneously. The geometry and number of these Powerchip arrays will be determined by the amount of electrical power required and the geometry and amount of heat provided by the engine and its exhaust gases.

For example, on a standard, two cylinder V style engine, a Powerchip can be attached to each header, multiple hotspots on the engine itself and one or more along the exhaust pipes and mufflers.

Figure 2:
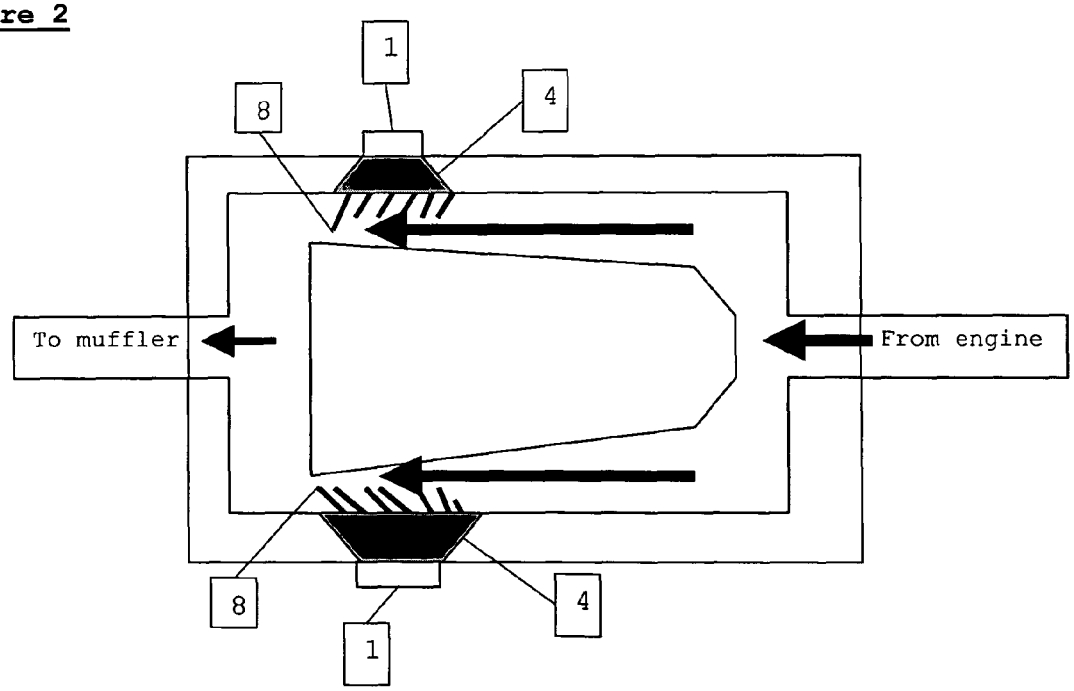
FIG. 2 is a horizontal cross section of a means of focusing heat from exhaust gases for use in power generation.

Referring now to FIG. 2, a heat concentrator similar to a catalytic converter is used to focus heat after the engine and before the muffler. This heat concentrator comprises a system of inner chambers and foils 8 which impede the flow of hot exhaust gases, absorb the heat and channel it through heat conductors 4 to Powerchips 1 in a similar fashion to a catalytic converter, which functions by heating the exhaust gases in order to break down complex chemical compounds. Any number of foils and chambers may be used.

A catalytic converter can be expected to reach temperatures many hundreds of degrees higher than the rest of the exhaust, but a considerable amount of this heat is used in the endothermic breaking up of complex chemical compounds. The heat concentrator of the current invention does not use ceramic bricks to absorb and heat these compounds and thus can reach high temperatures with less exhaust back pressure. Additional heat concentrators may be used on vehicles with more than one exhaust line.

Figure 3:
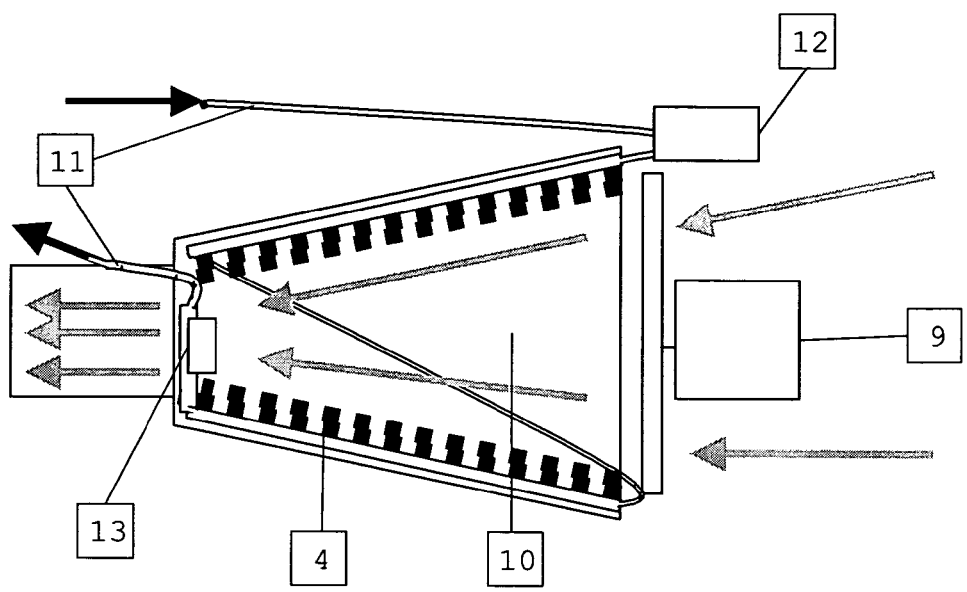
FIG. 3 is a horizontal cross section of both a water cooling system and a blower/chamber configuration for use in cooling and forced induction systems.

Referring now to FIG. 3, which shows a water cooling system having a blower 9 that pushes air through a conical chamber 10 lined with foils acting as heat sinks 4 connected to the water cooling system 11. The water is pushed through by means of a simple pump or pumps 12. To provide additional cooling, the foil system can be connected to Coolchips 13 at the exit of the conical chamber. This system will provide cooled water to the Powerchips and/or the engine, and also air flow which can be used in any number of manners, including a forced induction system, to provide air flow through a pored seat or to pull or push air around hot outer surfaces of the engine while idling. This system can be easily scaled to provide the amount of cooling or airflow needed.

Preferably the additional electrical power needed to power the cooler is provided by Powerchips as disclosed above.

One or more of these chambers can be used. For example, if it is not possible to fit a single chamber system on the motorcycle, two separate smaller chambers, each with their own blowers, cooling systems and Coolchips can be used.

The above combination of systems should increase engine performance, create additional electrical power and aid in keeping the operator and engine cooler.

The above systems also allow for the engine itself to be water cooled more readily through the additional electrical energy provided, and the use of highly efficient cooling methods, such as through Coolchips.

The above systems could also be used to boost the cooling potential of an existing water cooling system. The electricity provided could be used to power electric pumps as opposed to ones that are connected to engine components, or the chamber/ Coolchips system could be used to replace radiator/fan systems.

Electrical power generation through Powerchips is aided by, but does not require any moving parts. However, efficiency is increased by the use of cooling methods such as fans or conventional water cooling systems.

The above systems can be added with little or no modification to the engine itself, which allows for these systems to be sold as aftermarket packages.

Airflow from the blower apparatus can be diverted through a pored seat in order to keep the rider's thighs cool and dry.

Any number of thermally conducting materials can be used as an interface between the device and the hot surface, provided they do not melt at the temperatures involved, such as copper or aluminum.

The thermionic or thermotunneling converters described are able to function more efficiently than prior art devices, and will greatly increase the efficiency of the engine, as explained below.

Conservatively the metal of an exhaust is 1000 degrees Fahrenheit. With an average ambient temperature around the exhaust being 80 degrees Fahrenheit, 0.189 Watts would be produced for each Watt of heat transferred with a device operating at 30% Carnot efficiency. The thermionic devices in mind are projected to operate at 70% Carnot efficiency, and these devices would therefore produce much larger amounts of electricity for each Watt of heat transferred.

Using 40 hp as a rough average of hp produced during normal city riding, conservatively one can assume that around 80 hp of power is waste heat, seeing as the average engine is around 33% efficient. Depending on engine geometry and design, and the optional implementation of devices that would help to focus exhaust heat and ambient engine heat, the percentage of waste heat available to the thermotunneling devices would vary greatly. If 20% of the waste heat would be harnessed using the 70% Carnot efficiency numbers above, 5,261 Watts of electricity would be produced from an engine producing in the average of 40 hp to the wheel. Using the same percentages, at a peak hp of 80 hp to the wheel, the engine will most likely be less efficient and probably producing more than 160 hp of waste heat, which if 20% were also collected, could provide 10,532 Watts at peak wheel hp.

Naturally the amount of waste heat and usable horsepower of the engine will vary greatly during a ride, but the average temperature of the engine components should stay roughly the same, outside of extreme conditions. The amount of heat transmitted through exhaust will vary greatly, but through the use of a device mentioned similar to a catalytic converter, there will be ample heat available to the chips to produce electricity from, even if the engine is left to idle for periods of time. One embodiment includes a system to store excess electricity produced during acceleration.

This system is projected to work extremely well in high performance motorcycles, because the more waste heat the engine produces, the more electricity the thermotunneling devices produce to power forced induction and cooling for the engine.

If the device is placed closer to the engine, such as onto a header, manifold, or even the engine itself, the hot temperature can be even greater. Also if the device were attached to a device similar to a catalytic converter, the temperature can be increased by 900 degrees Fahrenheit, conservatively, almost doubling the output Wattage.

The additional electricity available can be used to power the optional blower system mentioned, either to aid in cooling the rider and engine during idling, or to provide forced induction to the engine during acceleration. All engines have an optimum fuel/air ratio at which they are most efficient. Most often efficiency is sacrificed because of the engine's inability to pull in enough air during acceleration and high RPMs. Even if the engine is not designed for high compression forced induction, this system could still provide additional efficiency to the engine by always providing the optimum amount of air to the engine. This system could also allow for the air coming into the engine to be cooled significantly as compared to the air the engine would take in normally. Cooler air carries more oxygen per volume and allows for higher compression in the cylinder before detonation. This system would also allow for high performance forced induction motorcycle engine to be produced, without the complexity and maintenance of a mounted mechanical blower.

Though the invention has been described with reference to specific preferred embodiments thereof, many variations and modifications will immediately become apparent to those skilled in the art. For example, the use of thermotunneling devices to both produce electricity from excess heat, and the use of that electricity to cool or provide power to other components is in no way limited to small vehicles. This system could be used on anything that produced an abundance of waste heat, such as large industrial generators, pumps, earth movers, etc., and the system for forced induction can be used on any engine that can benefit from increased $O_2$ availability.

Furthermore, the ability of the system to turn waste heat electricity into cooling ability need not be constrained to the cooling of a rider or even the motor/engine itself. The excess electricity can be used in the aid to cool/power external components, for example the same system could be used on large industrial saws and the excess electricity used to help pump the necessary cooling water onto the blade.

In particular, any device that exchanges heat for electrical power may replace thermionic converters.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description.

The invention claimed is:

1. A system for cooling sections of a motorcycle which produce excess heat comprising an apparatus containing water, a blower, and a conical chamber lined with foils in thermal contact with an electrical power generator, said electrical power generator comprising a thermionic or thermotunneling converter in thermal contact with said sections of the motorcycle which produce excess heat, and one or more heat concentrators that focuses heat towards said converters, wherein said heat concentrator comprises a system of inner chambers and foils.

2. The generator of claim 1 wherein said thermionic or thermotunneling converter is in thermal contact with a heat sink.

3. The generator of claim 2 wherein said heat sink is additionally cooled by means of a fan.

4. The generator of claim 2 wherein said heat sink comprises a water cooling system.

5. The system of claim 1, wherein said foils act as heat sinks.

6. The system of claim 1, wherein said water is pushed through said chamber by means of a pump.

7. The generator of claim 1 wherein said sections comprise the engine of said motorcycle.

8. The generator of claim 1 wherein said sections comprise the exhaust of said motorcycle.

9. The generator of claim 1 wherein said sections comprise a header of said motorcycle.

10. The generator of claim 1 wherein said sections comprise a muffler of said motorcycle.

11. The generator of claim 1 wherein said thermionic or thermotunneling converter is in thermal contact with said sections via a heat conductor.

12. The generator of claim 1 wherein said inner chambers and foils are attached to heat conductors.

\* \* \* \* \*